C. F. MURDOCK.
Stop-Cock.
No. 167,463. Patented Sept. 7, 1875.
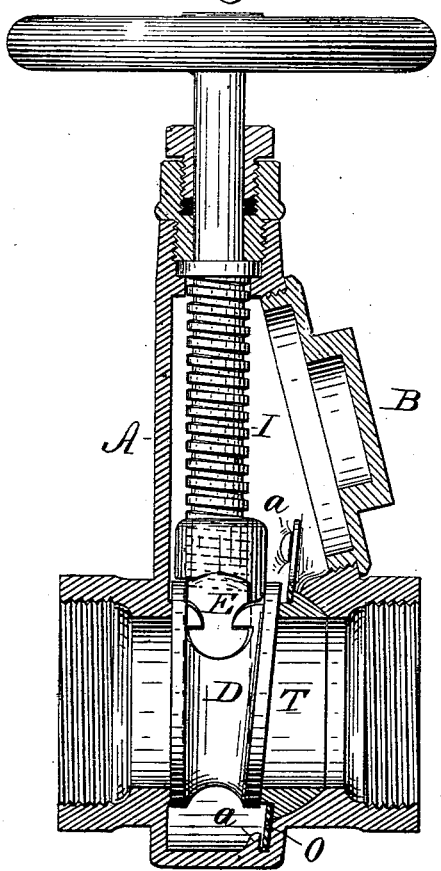
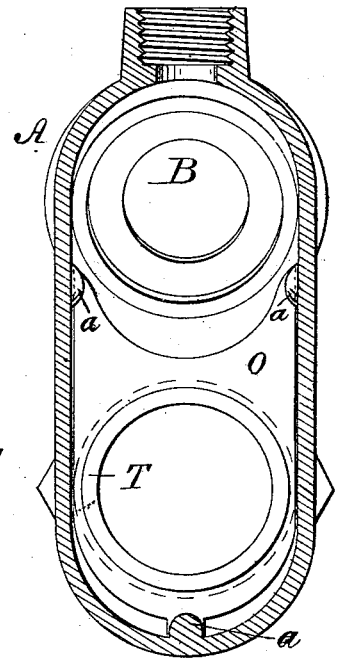
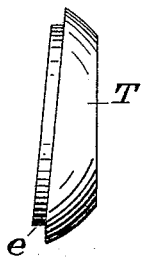
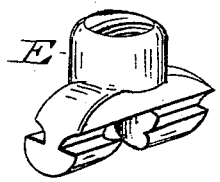
WITNESSES:
Will H. Dodge
Donn Twitchell
INVENTOR:
C. F. Murdock,
by his Atty
Dodge & Son,

UNITED STATES PATENT OFFICE.

CHARLES F. MURDOCK, OF DETROIT, MICHIGAN.

IMPROVEMENT IN STOP-COCKS.

Specification forming part of Letters Patent No. 167,463, dated September 7, 1875; application filed August 25, 1875.

*To all whom it may concern:*

Be it known that I, CHARLES F. MURDOCK, of Detroit, in the county of Wayne and State of Michigan, have invented certain Improvements in Stop-Cocks or Valves, of which the following is a specification:

My invention consists of a stop-cock or valve having an adjustable ring or seat on one or both sides for the valve to fit against, and in a nut for the stem to work in, connected to the valve by a dovetail joint, so as to permit the nut to move sufficiently to allow the parts to work without binding or cramping, all as hereinafter more fully set forth.

Figure 1 is a side elevation of a stop-cock made on my plan, with the case shown in section. Fig. 2 is a longitudinal section of the case, taken at right angles to Fig. 1. Figs. 3 and 4 are views of portions shown detached.

Heretofore this class of valves have been made with a solid gate fitting against solid or rigid seats, or with the gate made so as to adjust itself to the rigid seats, against which it closed. In the first case, whenever any foreign matter got between the gate and its seat it would not shut perfectly, and where the gate was made with its faces adjustable to their seats they were apt to spring near their outer edges, at which points they could not be supported, as, in order to make them adjust themselves to their seats, they had to have their support or bearing at or near their center. To obviate this latter difficulty the valve-plates of the gate have to be very much increased in thickness, so that in a gate of several feet in diameter, such as are used in large water-pipes, (for which purpose this class of stop-cocks are now used,) the valve-plates have to be made very thick and heavy, thus making them expensive and more difficult to operate. The same is true, also, to a greater or less extent, with those of a smaller size, which have to withstand a heavy pressure, either of steam or water.

The object of my present invention is to so construct a stop-cock as to enable a solid gate to be used, and at the same time enable it to close perfectly. This I accomplish by making one or both of the valve-seats self-adjusting, which may be done in various ways.

The simplest and best plan I have represented in the drawings, where D represents a solid gate, and T the self-adjusting seat, against which the gate or valve-plate seats itself when closed. This valve-seat is shown detached in Fig. 3. As there shown, it has its exterior surface made spherical in form, and is fitted in a corresponding seat within the case A, thus forming a movable or self-adjusting ring surrounding the inner mouth of the straight through-passage. Its inner face is made true for the gate D to bear against when the latter is closed, as shown in Fig. 1. This ring or seat T may be held in place by any suitable means. In this case I have shown it held in position by an elastic plate, O, Fig. 2, which has a hole in it to fit over the neck *e* of the ring T, the plate being held in place by small lugs *a* on the inner side of the shell, as shown in Figs. 1 and 2. In this case I have shown but one of these self-adjusting rings or seats, the other side of the gate being made straight, and bearing against a solid seat; but it is obvious that they may be inserted on both sides, and that the gate may be inclined on both its faces, if desired. The shell or case A, as in my patent of April 7, 1874, has an opening in one side, closed by a screw-cap or plug, B, as shown in Fig. 1; but in this case I make the side of the shell in which the hole is made inclined, as represented. This I do for the double purpose of affording greater facility in getting at it with the necessary tools in finishing it, it being desirable to have this opening as close to the part forming the passage-way as possible; and, second, to enable the plate O to be more readily and easily put in place. In other respects the shell may be made in the usual style.

The gate is operated by a screw-stem, I, as usual, which works in a loose nut, E, shown detached in Fig. 4, and in position in Fig. 1. This nut E I connect to the gate D by a joint, shown in Fig. 1. This joint consists of a T-head formed on the under side of the nut and a corresponding groove cut in the upper edge of the gate, the nut being free to slide endwise in its groove in the gate, so as to permit the parts to adjust themselves each to the other and to the parts with which they are connected or with which they come in contact. This joint is also made loose enough to permit a slight play laterally just sufficient to compensate for any inaccuracy of workmanship, and to prevent any cramping or binding of the parts when the gate is operated. At the same time the form of the joint is such that when the gate is retracted within the shell it is held sufficiently rigid to prevent its face from rubbing against the side of the shell, and thus prevent it from becoming scratched by particles of sand or other foreign substance.

By this method of constructing a stop-cock with a self-adjusting valve-seat I am enabled to use a solid gate, and at the same time have it close with the same accuracy and facility as those having adjustable valve-plates. This also enables me to make the larger sizes with much less metal in the gate, and also in the case or shell, than is required when the valve-plates are made adjustable. The gate, being solid, is only required to be of such thickness as to afford the necessary strength to withstand the required pressure, while the self-adjusting seat or ring is supported all around by the shell, and cannot therefore spring or yield.

I do not limit myself to the special construction shown, as the description given will enable those skilled in the art to make and use self-adjusting seats of various forms and styles.

Having thus described my invention, what I claim is—

1. A stop-cock or valve having an adjustable valve-seat so constructed and arranged in relation to the gate or valve-plate as to adjust itself thereto as the gate is closed.

2. The case or shell having its side in which the opening is made inclined, substantially as and for the purpose set forth.

3. The plate O, arranged within the shell, so as to hold the self-adjusting seat in position, as set forth.

C. F. MURDOCK.

Witnesses:
  W. C. DODGE,
  JNO. D. PATTEN.